United States Patent [19]

Balding

[11] Patent Number: 4,635,342

[45] Date of Patent: Jan. 13, 1987

[54] PLANO-MILLING MACHINE

[75] Inventor: Victor H. Balding, Taverham, United Kingdom

[73] Assignee: Beaver Machine Tool Sales Limited, Norwich, England

[21] Appl. No.: 700,126

[22] Filed: Feb. 11, 1985

[51] Int. Cl.⁴ .......................... B23Q 3/156; B23C 1/12
[52] U.S. Cl. .................................. 29/568; 29/48.5 A; 74/813 L; 408/35; 409/201; 409/212; 409/215
[58] Field of Search .............. 409/215, 212, 235, 201, 409/204, 211, 231; 408/234, 236, 238, 35; 74/813 R, 813 L; 29/568, 48.5 R, 48.5 A, 49

[56] References Cited

U.S. PATENT DOCUMENTS

| | | | |
|---|---|---|---|
| 1,933,575 | 11/1933 | Woytych | 409/215 |
| 1,937,408 | 11/1933 | Johnson | 409/215 X |
| 2,227,410 | 12/1940 | Johnson | 409/215 |
| 3,460,435 | 8/1969 | Hucksehl | 409/235 X |
| 3,587,389 | 6/1971 | Kreimer | 409/212 X |

FOREIGN PATENT DOCUMENTS

| | | | |
|---|---|---|---|
| 0068952 | 1/1983 | European Pat. Off. | 409/201 |
| 2646492 | 5/1977 | Fed. Rep. of Germany | 409/235 |

Primary Examiner—William R. Briggs

[57] ABSTRACT

The head of a plano-milling machine has two jointly rotatable, perpendicularly-related collet spindles journalled on bearings in a box-like housing which can be mounted on the slide of the machine so as to be indexable about the axis of the vertical collet spindle to present the horizontal collet spindle to different vertical faces of a workpiece.

The head is journalled to the slide by a combined indexing means and hydrostatic bearing which includes means to lock the head in a chosen angular position. Provision is made for numerical control and automatic tool changing.

4 Claims, 8 Drawing Figures

PLANO-MILLING MACHINE

BACKGROUND OF THE INVENTION

This invention relates to a plano-milling machine of the closed planer type, which is to say a machine tool in which heavy workpieces, e.g. of up to four tons in weight, are moved horizontally through a bridge structure comprising columns on either sie of the table on which the workpieces are moved spanned above the table by a cross-rail carrying the machining head. The head, which has a spindle to which different tools can be fitted, is movable both perpendicularly (the Z axis) and horizontally (the Y axis) at right angles to the table supporting the workpiece to machine the upper surface of the latter.

At present the heads of such machines comprise a single spindle which is at all times vertical, i.e. rotates the associated collet about a vertical (Z) axis whatever the position of the head. Consequently after machining one face of a workpiece it is necessary to reload it in a new, fixed position on the table to machine another face. This difficult and time-wasting operation may have to be carried out four times after machining the top surface of the workpiece in order to present its side and end surfaces to the milling or other tool engaged in the collet.

BRIEF SUMMARY OF THE INVENTION

A principal object of the present invention is to overcome this problem by providing a head for such a machine which has perpendicularly related collet spindles such that tools engaged by the respective collets can be used to work different surfaces of the same workpiece without altering the position of the latter on the table. The head may comprise two, perpendicularly related collet spindles which may be interconnected to be commonly driven and the head may be adapted to be mounted in the machine so as to be displaceable in the direction of the axis of rotation of one of the spindles and at right-angles thereto, so that the attitude (e.g. vertical) of said one spindle axis remains constant, and additionally the head may be rotatable about said one spindle axis to alter the angular position of the other spindle in a plane (e.g. horizontal) to which said one spindle axis is perpendicular. In this way, by suitable rotary indexing movements of the head, a tool engaged by the collet of said other spindle may be presented sequentially to side and end faces of a workpiece without the necessity of reloading the latter on the table. By changing the tools engaged by the collets different operations such as milling, drilling, boring and tapping can be carried out on different surfaces of the workpiece, again without the necessity of reloading the latter, with consequent reduction of set-up time and increased productivity. Furthermore, with automatic tool-changing combined with numerical control of the indexing and other movements of the head it will be possible to introduce a fully automated procedure whereby all necessary operations can be performed on the workpiece without reloading it on the table.

BRIEF DESCRIPTION OF THE DRAWINGS

An embodiment of the present invention will now be described by way of example, with reference to the accompanying drawings.

In the drawings.

DETAILED DESCRIPTION OF PREFERRED EMBODIMENT

Figure 1:
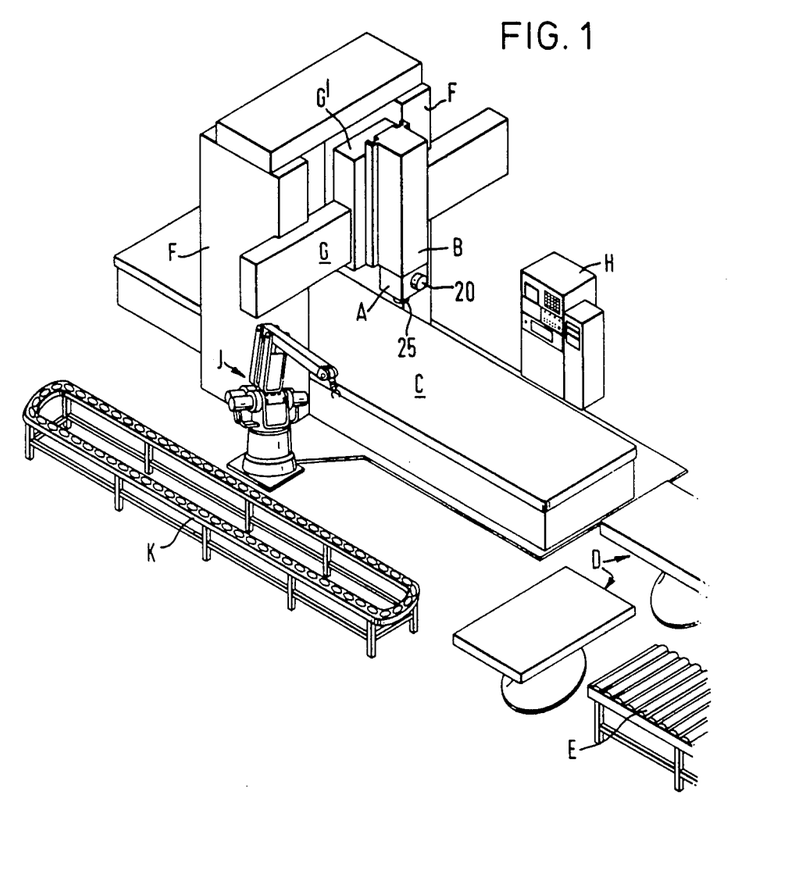
FIG. 1 is a general arrangement view of a plano-milling machine in accordance with the invention.

Referring first to FIG. 1, the closed planer, plano-milling machine schematically illustrated comprises a horizontal table C over which workpieces (not shown) are movable in the direction indicated "X axis". At the input end of the table (to the right as viewed) a turntable arrangement D is provided for selectively transferring onto the table C workpieces from a plurality of roller conveyors such as E. Columns F on opposite sides of the table C support a bridge G along which a saddle G' is movable horizontally in a direction ("Y axis") at right-angles to the direction of movement ("X axis") of workpieces along the table C. A slide B is vertically movable ("Z axis") relative to the saddle G' and carries at its lower end a tool-carrying head A which is rotatable relative to the slide B about the Z axis to present a tool held by a horizontal arbor 20 to different vertical surfaces of a workpiece.

On one side of the table C is a numerical control system H which can be programmed to control a sequence of movements of the saddle G', slide B and indexable head A induced by pressurised fluid, and on the other side of the table C is a robot arm J which is actuable to replace tools held in a horizontal arbor 20 of the head A and in a vertical arbor 25 thereof, the robot J selecting tools from an endless, movable tool-holder K beside it. The movements of the robot arm J and of the tool-holder K are of course co-ordinated so that the arm can replace a tool removed from the head A in its allotted position in the tool-holder K prior to picking up a different tool.

Between the bottom end of the slide B and head A is a combined indexing mechanism and hydrostatic bearing illustrated in FIGS. 3 to 8. The mechanism comprises relatively rotatable, annular upper and lower portions 39 and 40 of which the upper portion 39 is fixed relative to the slide B while a flange 41 on the lower portion has apertures whereby it may be bolted by bolts 42 to the top 14 (FIG. 2) of the housing of the head A. The annular structure of the indexing mechanism allows the top end 24 of the vertical spindle 17 to project into it, where splines 27 are engageable by drive means (not shown) passing through the mechanism 39,40 to rotate the spindle 17. The drive means may be a D.C. electric motor (not shown) driving the spindle 17 via a gear box (not shown).

In operation the head A is mechanically clamped in a chosen one of four positions of angular adjustment relative to the slide B by a vertically movable wedge 43 (FIGS. 4, 7 and 8) the tapered, lower end of which is engageable in a selected one of four U-shaped guides 44A,44B,44C and 44D equi-angularly spaced about and fixed to the rotary portion 40 of the bearing mechanism. In FIG. 8 the wedge 43 is shown engaged in the guide 44A. To rotate the head A to a different angular position first the wedge 43 is lifted out of the guide 44A and then oil under pressure is supplied to hydrostatic bearings 58 and 59 at opposite axial ends of the assembly and also to radial bearing faces 50 and 51 so that the indexing mechanism becomes a combined radial and axial hydrostatic bearing assembly permitting free rotation of the head assembly A. The hydrostatic bearings are supplied via fixed pipes 101 seen in FIG. 3 and cross drillings such as 102 in part 39. The flow rate for each of the pipes is adjusted by restrictors 103 shown at the top of FIG. 7 and the right-hand side in FIG. 3. To rotate the rotary portion 40, and with it the head A, pressurised oil is admitted to an annular chamber 48 between the stationary and rotary parts 39 and 40, so that it acts on one side or the other of a vane 50 (FIG. 6) fixed relative to the rotary part 40 between the vane 50 and a stop 49 fixed relative to the stationary part 39. The vane 50 and stop 49 each extend axially throughout the chamber 48 and subdivide it into arcuate segments 51A and 51B which reciprocally vary in length as the vane 50 moves around the chamber 48. Pressurised oil is supplied to the chamber 48 on one side or the other of the fixed stop 49 via ports 52 or 53 opening radially into the chamber 48 from axial bores in the stationary part 39, one of which is shown at 54 in FIG. 5. These axial bores are supplied via pipes 55 and 56 (FIG. 3) at the top of the stationary part 39, which pipes in turn communicate with the source of pressurised oil via a valve (not shown) which ensures that when one of them communicates with the source the other communicates with reservoir. Thus to rotate the head A fixed to the rotary part 40 anti-clockwise as viewed in FIG. 6 pressurised oil is admitted through the port 52 while the port 53 acts as a vent for oil in the chamber segment 51B. Conversely, to effect clockwise rotation of the head A pressurised oil is admitted through the port 53 while the port 52 servwes as a vent.

The supply of pressurised oil through one or the other of the pipes 55 and 56 is controlled by four proximity switches 57 equi-angularly spaced about the stationary part 39 at positions such as to arrest movement of the rotary part 4C and head A when the wedge 43 is generally aligned with a respective one of the U-shaped guides 44A–D. The subsequent insertion of the wedge 43 in the selected guide positively locks the rotary part 40 in a selected one of four possible indexed positions of the head A in which its horizontal spindle 21 is either parallel with the X axis or parallel with the Y axis and a tool held in its arbor 20 is presented toward one or the other of the end faces or one or the other of the sides of a workpiece on the table C. Simultaneously with engagement of the wedge 43 in one of the guides 44A–D the supply of pressurised oil to the upper axial end face 58 of the assembly is cut off so that continued supply of pressurised oil to the lower axial end face 59 hydraulically clamps the rotary and stationary parts 39 and 40 together.

Figure 7:
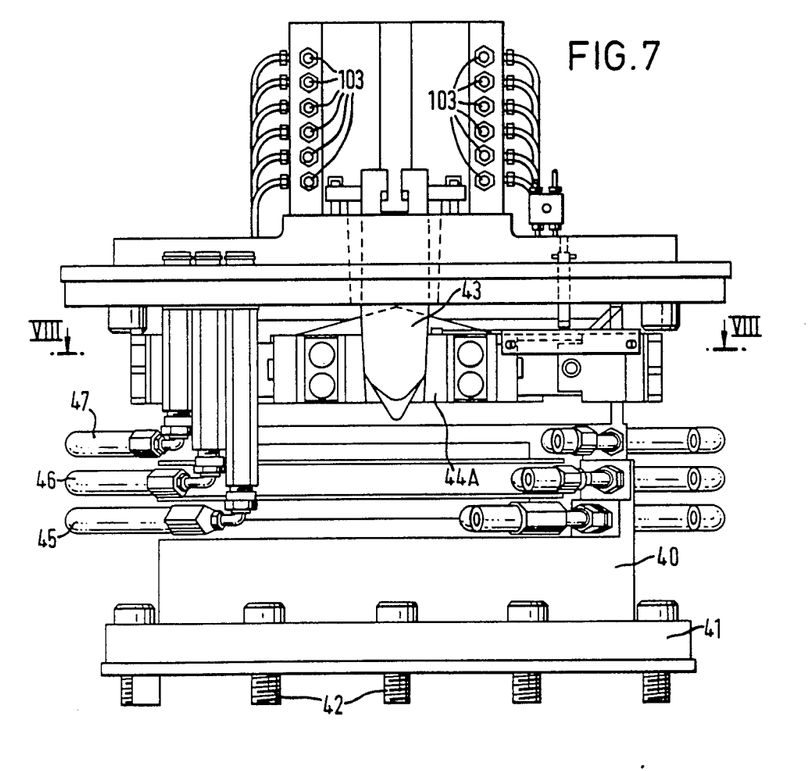
FIG. 7 being a view, with outer parts removed, taken in the direction of the arrow "E" of FIG. 4, and FIG. 8 being a plan view in a section taken on the line VIII—VIII of FIG. 7.
Figure 8:
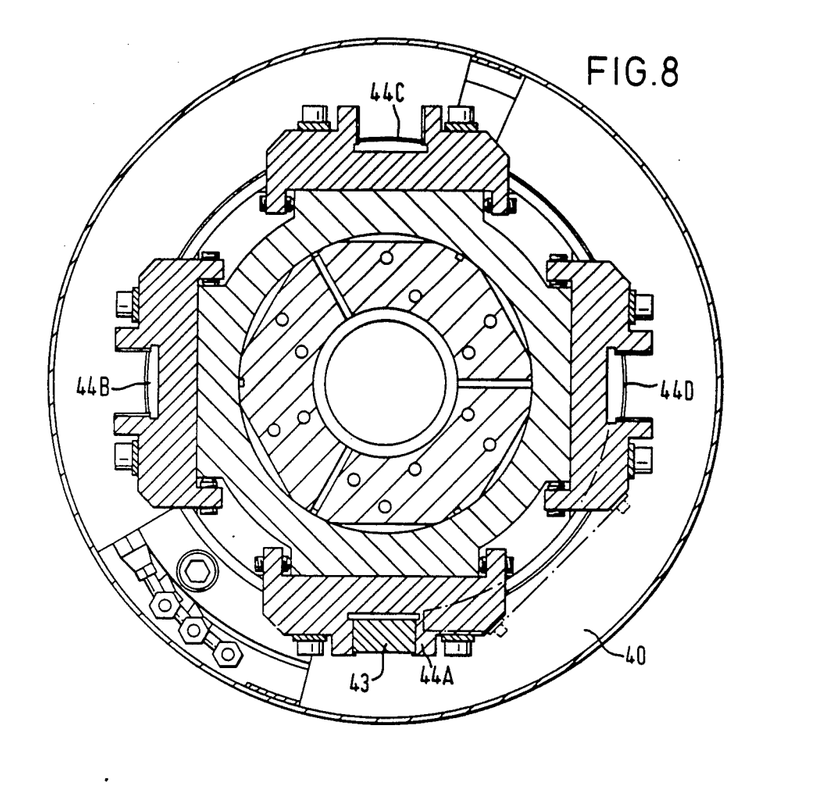

In FIG. 7 the rotary part 40 is shown with its outer casing 60 removed so that the lower part of the wedge 43 and the guide 44A are visible. The casing 60, however, has part-annular compartments 60A,60B and 60C in which hoses 45,46 and 47 are respectively located in a mutually separated relation and in a manner such that they can fold (see FIG. 6) to accommodate rotary movement of the part 40 without projecting outwardly of the assembly. Pipe 45 carries a pressure lubrication oil to the bearings and gears shown in FIG. 2. Pipe 47 supplies pressurised oil to the cylinders 33 and 34 in the rear ends of the spindles 17 and 21 in order to release the drawbars 36 and 37 so that tools can be removed from the collets. These work simultaneously irrespective of which spindle has a tool in it. The oil used for lubrication and cylinder operation as well as the hydrostatic bearings is of the same type, and all drains to a sump pan 100 in the lower part of the indexing head (FIG. 2) from where it is scavenged by a pump (not shown) and returned to a reservoir via pipe 46. The casing 60 at all times contains the hoses 45–47 and prevents them fouling with stationary components as the head A is indexed.

Figure 2:
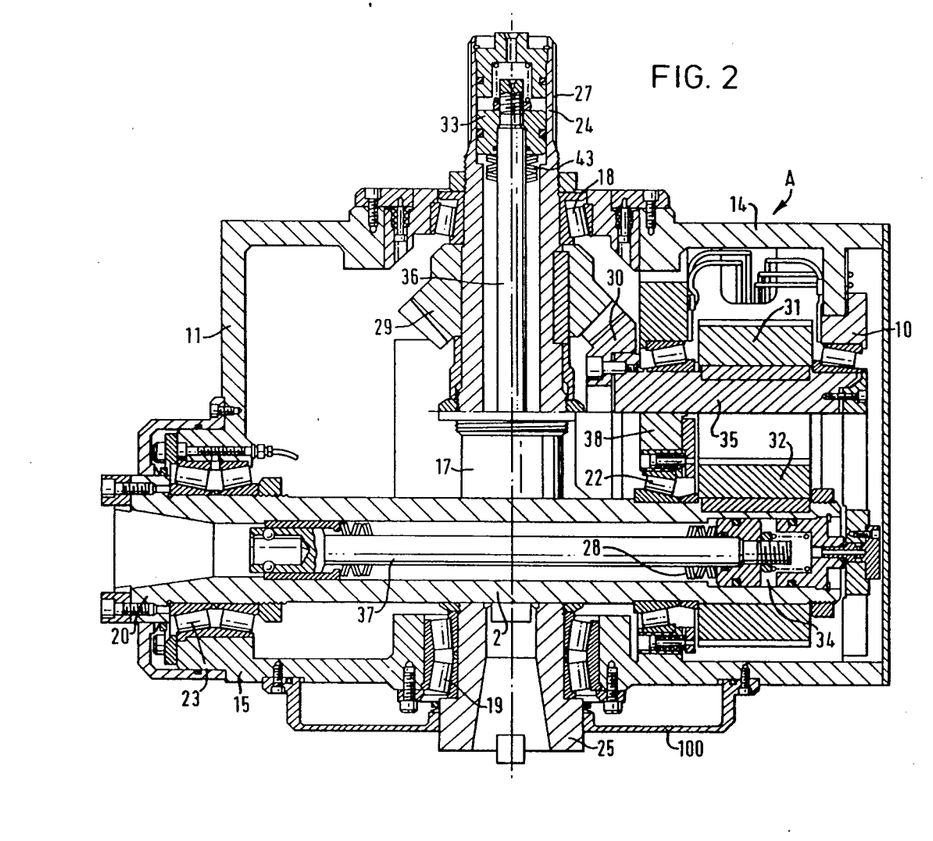
FIG. 2 is a sectional elevation of the twin spindle head A of FIG. 1, and FIGS. 3 to 8 are illustrations of the rotary indexing support for the head A carried by the bottom portion of the slide B in FIG. 1 so as to be vertically movable therewith.
Figure 3:
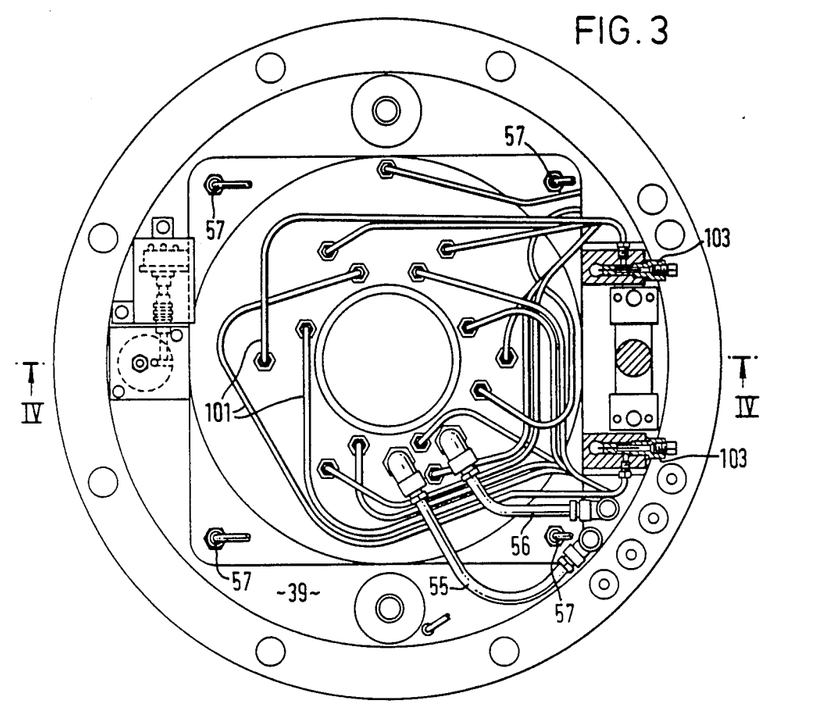
FIG. 3 being a view from above of the support.
Figure 4:
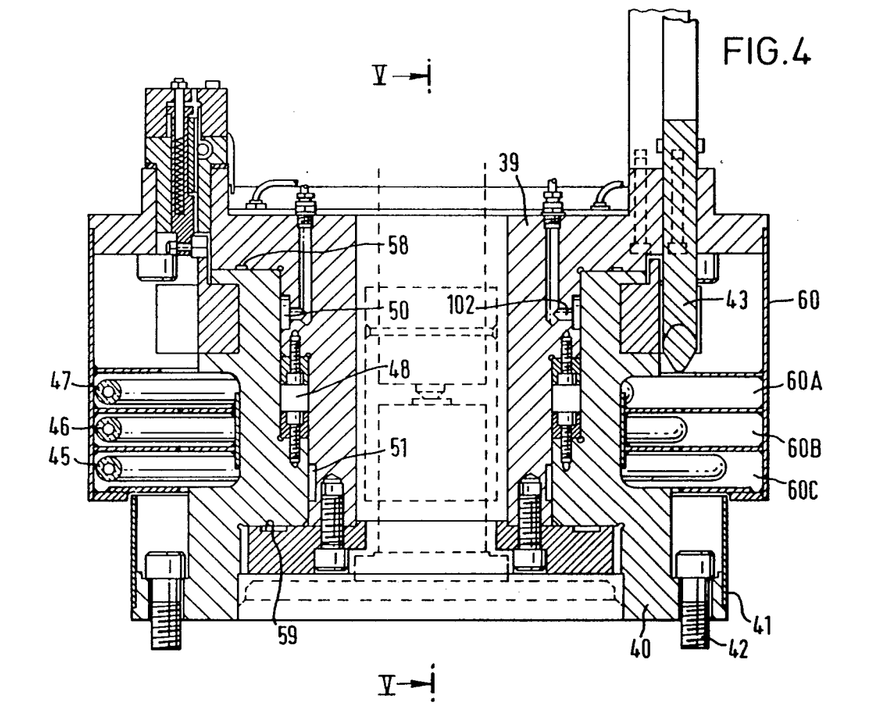
FIG. 4 being a sectional elevation taken on the line IV—IV of FIG. 3.
Figure 5:
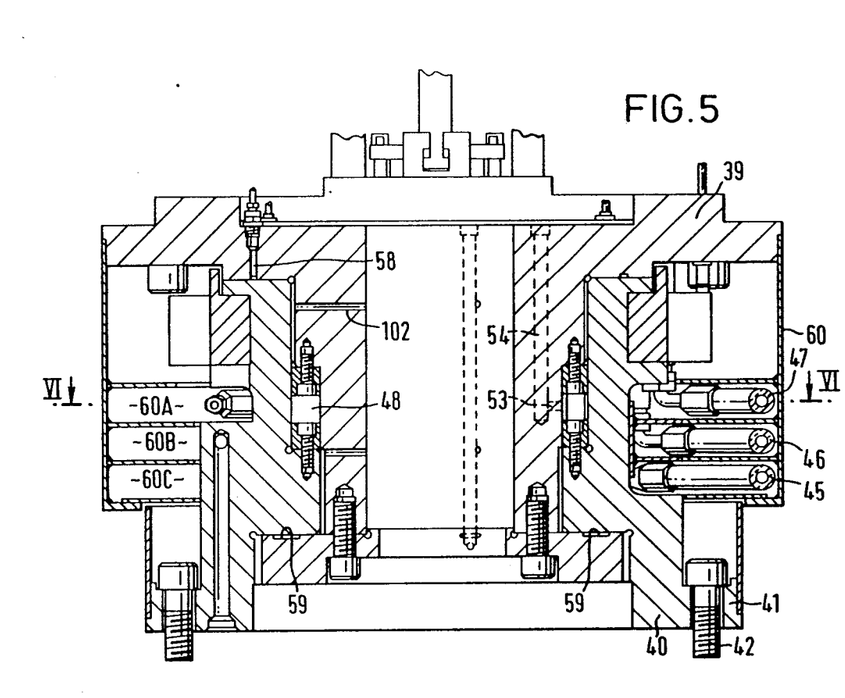
FIG. 5 being a sectional elevation taken on the line V—V of FIG. 4.
Figure 6:
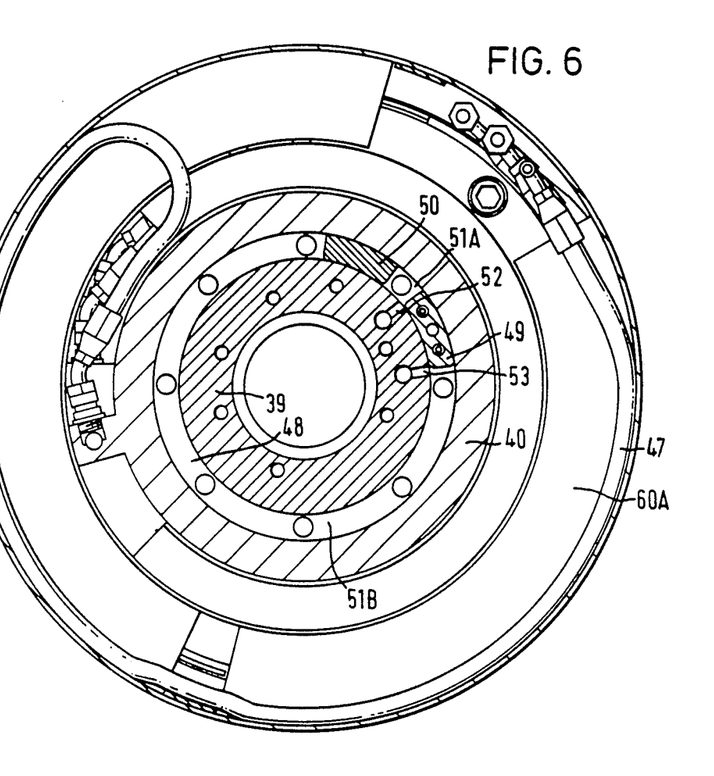
FIG. 6 being a section in plan taken on the line VI—VI of FIG. 5.

The construction of the head A will now be described with reference to FIG. 2:

The head A comprises a box-like housing, having side walls of which two are shown at 10 and 11, a top 14 which is secured to a flange (not shown) engaged by the bolts 42 and a bottom 15. The head is rotatable by the indexing mechanism of FIGS. 3 to 8 about the axis Z of vertical collet spindle 17 which is rotatably mounted in the box by bearings 18 and 19 in its top and bottom. The top bearing 18 is a spring-loaded taper roller bearing and the bottom bearing 19 is a double-row taper roller bearing. The bodily rotation of the box about the axis Z enables the tool-holding arbor 20 at one end of a horizontal collet spindle 21 to be indexed by the rotating means of FIGS. 3 to 8 between four positions at 90° angular intervals. The horizontal spindle is mounted in bearings 22 and 23, respectively similar to the bearings 18 and 19, the bearing 23 being supported by the front wall 11, while the rear bearing 22 of the horizontal spindle is supported by a partition wall 38 within the box.

At its upper end 24 remote from that provided with the tool-holding arbor 25 the vertical spindle 17 has splines 27 for engagement by a splined drive shaft (not shown) which penetrates the annular indexing mechanism and is in turn driven via a gear box by a D.C. electric motor (not shown). The vertical spindle 17 and the horizontal spindle 21 are jointly rotated at the same speed (up to 2000 r.p.m.) by the input shaft, being coupled by a pair of vevel gears 29 and 30 and a pair of helical spur gears 31 and 32, the gear 31 rotating on a lay shaft 35 in bearings in the partition wall 38 and rear wall 10. The meshed spur gears 31 and 32 transmit the drive from the lay shaft 35 to the horizontal spindle 21. Means is provided whereby the mesh of the bevel gears may be adjusted without moving either of the spindles 17 and 21.

As illustrated the tool-holding arbor 25 and 20 of each spindle 17 and 21 is held by the collet of a spring-loaded drawbar 36 and 37. For fully automatic tool changing each spindle 17 and 21 has at its end remote from the arbor 25 or 20 an hydraulic cylinder 33 and 34 actuable to compress the spring stocks 43 and 28 of the drawbars 36 and 37.

I claim:

1. A plano-milling machine comprising a horizontal table over which workpieces are movable in a first, "X axis" direction, a bridge over the table, a saddle movable along the bridge in a second, horizontal "Y axis" direction at right-angles to said first direction, a slide vertically movable in a third, vertical, "Z axis" direction relative to the saddle, a head carried by the lower end of the slide and having collet spindles arranged with their respective axes of rotation perpendicularly related and interconnected to be commonly driven, the head being mounted in the machine to be displaceable in the direction of the axis of rotation of one of said collet spindles and at right-angles thereto with the attitude of said one spindle axis remaining constant and the head being rotatable relative to the slide about the "Z axis" whereby a tool held by a horizontal arbor of the head may be presented to different vertical surfaces of a workpiece on the table, a combined indexing mechanism and bearing whereby the slide rotatably supports the head, said combined indexing mechanism and bearing comprising relatively rotatable annular upper and lower portions through which drive means for a vertical spindle of the head passes, and angularly-spaced guides in which a vertically movable wedge member is selectively engageable to lock the two portions of the bearing against relative rotation when in a chosen angular relationship, said indexing mechanism comprising means for introducing fluid under pressure to a part-annular chamber between said bearing portions on one side or the other of a vane in the chamber fixed relative to the head, and proximity switches to cut off the supply of pressurised fluid when a selected one of said guides is aligned with said wedge member.

2. A plano-milling machine according to claim 1 wherein the combined indexing mechanism and bearing comprises a hydrostatic bearing.

3. A plano-milling machine as claimed in claim 1, wherein the head is rotatable about said one spindle axis to alter the angular position of the or each other spindle in a plane to which said one spindle axis is perpendicular.

4. A plano-milling machine as claimed in claim 3 and comprising means for effecting automatic tool changing and numerical control means for controlling the indexing and other movements of the head.

* * * * *